T. B. FORD.
ROCK-DRILLING MACHINE.
No. 188,734. Patented March 27, 1877.
2 Sheets—Sheet 1.
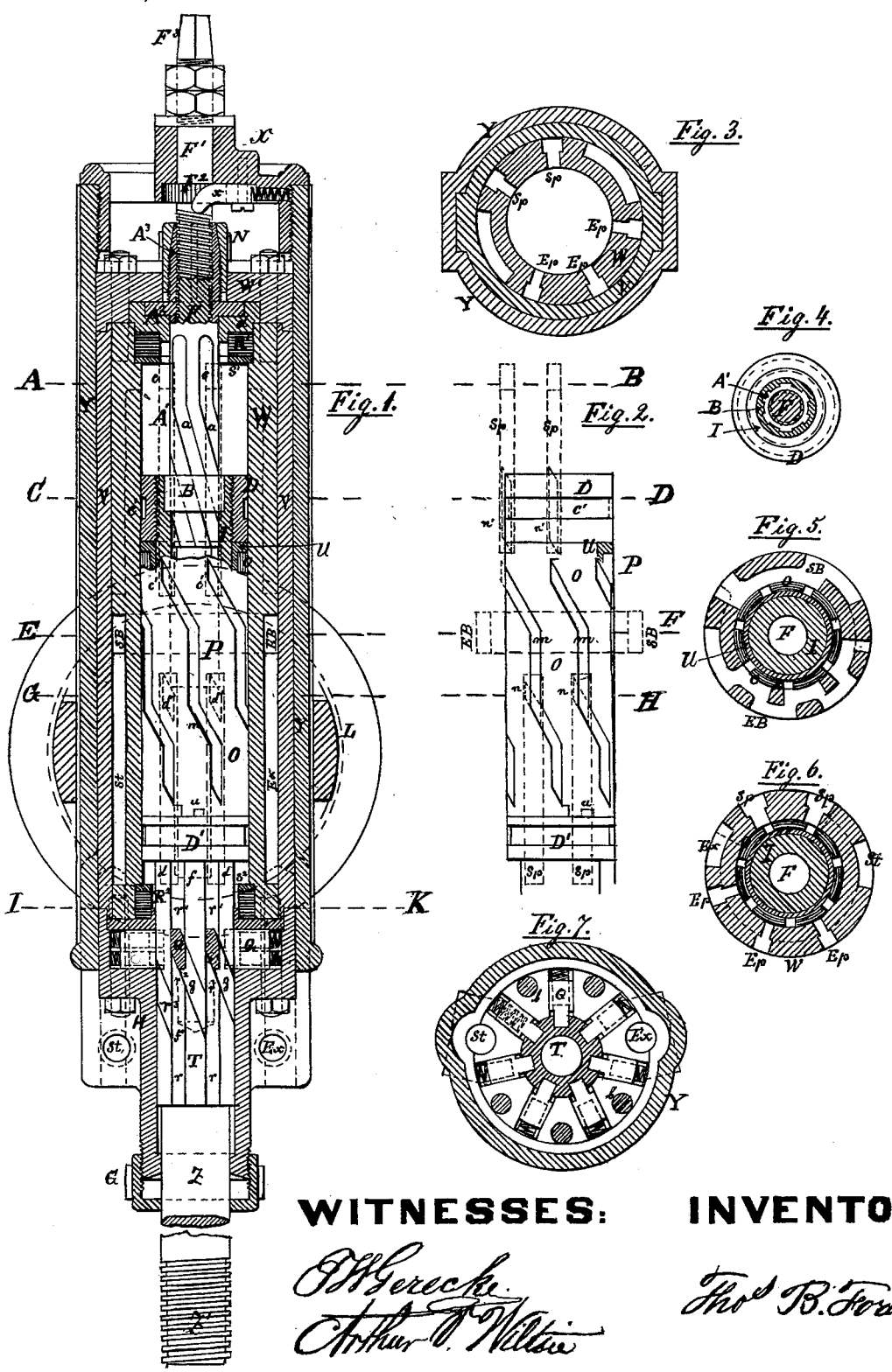
WITNESSES:
O. W. Gerecke
Arthur V. Wiltsie
INVENTOR
Thos. B. Ford

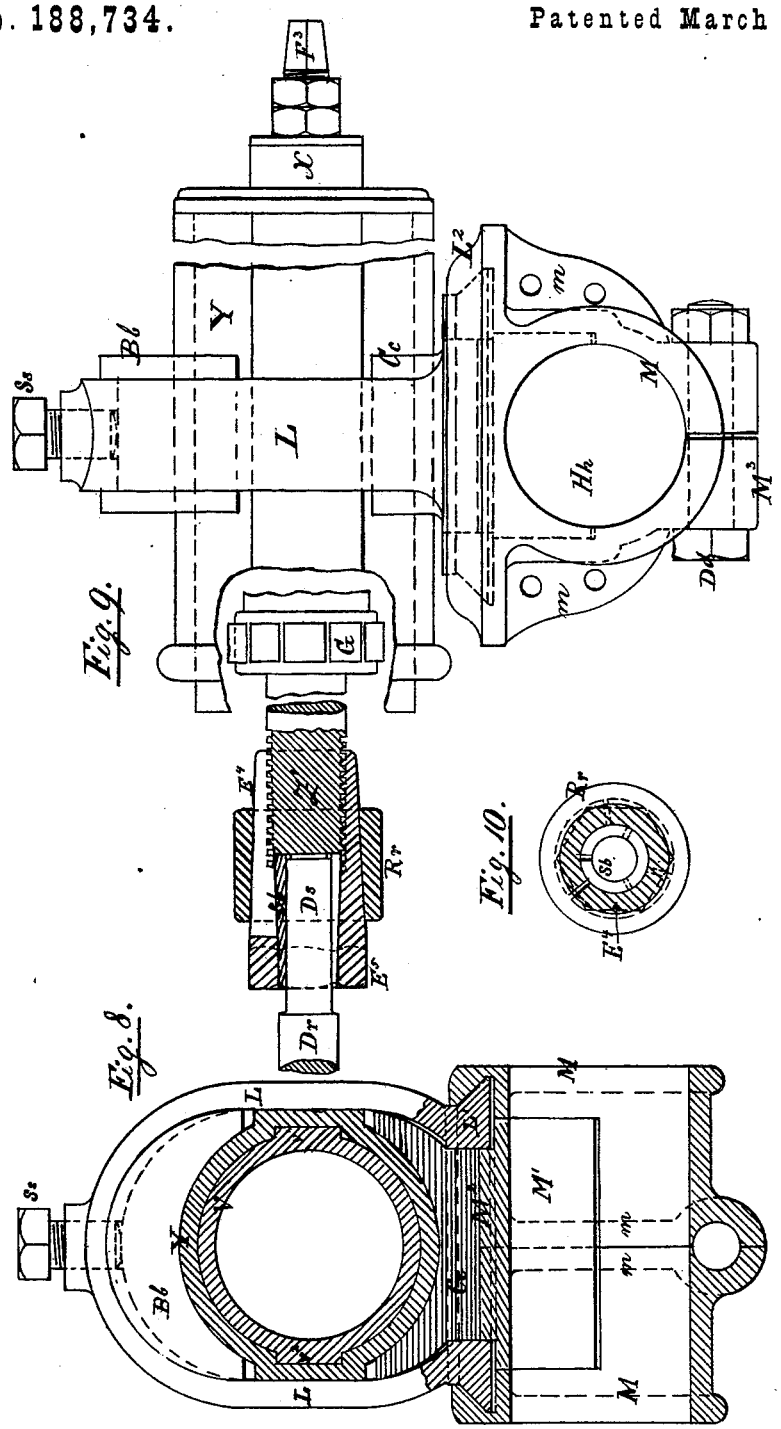

UNITED STATES PATENT OFFICE.

THOMAS B. FORD, OF NEWBURG, NEW YORK.

IMPROVEMENT IN ROCK-DRILLING MACHINES.

Specification forming part of Letters Patent No. 188,734, dated March 27, 1877; application filed February 26, 1876.

*To all whom it may concern:*

Be it known that I, THOMAS B. FORD, of Newburg, in the county of Orange and State of New York, have invented a new Rock-Drilling Machine, of which the following is a specification:

The first part of my invention relates to the combination of straight and spiral grooves in the piston-rod with pawls in the cylinder-head, thereby producing a straightforward stroke of the piston and a positive rotation of the same on the backward stroke, the pawls working alternately in those straight and spiral grooves to guide the piston, and also producing a simple valve movement.

The outside surface of the piston is grooved or recessed by slots or passages, which, during the motion of the piston, change their relative position to the openings and passages in the cylinder-shell, admitting steam or compressed air to either end of the piston from the steam-belt successively.

The feeding of the drill forward is obtained by the first part of the backward stroke of the piston being straight, which occurs when sufficient rock is cut away to allow the point of junction of the grooves in the piston-rod to pass below the pawls, returning which part of the stroke projections in the upper end of the piston work against the backward side of the spiral grooves in the feed-nut, the feed-screw being held stationary by a pawl engaging with a ratchet-wheel at its upper end. The piston, on its straightforward stroke, rotates the nut in the opposite direction, together with the screw, by means of a friction at the upper end of the feed-nut, the nut remaining stationary on the regular backward rotating stroke of the piston.

The second part of my invention relates to the outside form of the drilling-machine, and to the way of holding the drill to its work.

The cylinder of the drilling-machine, being entirely smooth on its outside, with two longitudinal projections for guides, requires a cylindrical shell to hold it, to guide it, and to allow it to be moved forward and backward by the feed-screw. This shell is held between suitable clamp-blocks by a set-screw in a strap, the bottom of which forms a disk, by which the drilling-machine is movable in one plane, while another movable block in a sleeve below the disk, operated by the same set-screw, secures it to the drilling-bar or tripod, on which the drill is movable in another plane vertical to the first. When it becomes necessary to move the shell longitudinally in the strap, the clamp can be held firmly to the bar by a friction-bolt through a boss on the lower side of the sleeve. The position of the shell in the clamp is not confined to a certain place; but the shell can be moved longitudinally, and may be firmly held at any part of its length, in this way giving a large range for adjustment of the drill to its work.

To explain more fully my invention, I refer to the annexed drawings in two sheets, in which, on Sheet 1—

Figure 1 represents a longitudinal section of the shell and cylinder, with a side view and partial section of the piston, showing the spiral and straight grooves in the piston-rod, with the pawls for the positive rotation; the grooves in the piston-surface, in connection with the exhaust-ports through the sides of the cylinder, for this position of the piston; the feed-nut, with the spiral grooves on the outside, and corresponding projections for the same in the end of the piston; the feed-screw, with the friction clamp-nut at the upper end of the feed-nut; the ratchet-wheel and pawl for the feed-screw, the upper end of the screw squared for drawing back the drill by means of a hand-crank, and the position of the whole drilling-machine in the clamp. Fig. 2 shows the reverse side of the piston, representing the grooves in the piston-surface, in connection with the steam-ports and passages through the shell of the cylinder for the same position of the piston as represented in Fig. 1. Fig. 3 is a transverse section through line A B, showing the steam and exhaust ports for the back end of the cylinder. Fig. 4 is a section of the piston in line C D, showing the projections in the upper end of the piston working in the spiral grooves of the feed-nut. Fig. 5 represents a section in lines E F through the steam and exhaust belt; Fig. 6 representing a section in line G H, showing the steam and exhaust ports for the forward end of the cylinder, and the grooves in the piston in their relative position to these ports for the position of the piston as shown in Fig. 1, with the steam and exhaust passages from and to the inlet and outlet. Fig. 7 is a back view of the front head, with the pawls in position in the grooves of the piston-rod. On Sheet 2, Fig. 8 represents a front elevation of the clamp-strap, with the friction-blocks, and section through the shell, clamp-disk, and friction-sleeve for the drilling-bar or tripod. Fig. 9 is a side elevation of the whole drilling-machine arranged in the clamp, with a section through the drill-chuck; Fig. 10 representing a transverse section of the chuck, showing the cuts in the nut and bush of the same.

The steam-cylinder of the drilling-machine is made in two parts—one inside cylinder, W, and one outside cylinder, V. The inside cylinder W is bored out to receive the piston P, and has ports S $p$ through the sides, to admit steam to the bore of the cylinder at each end, which connect with steam-passages S $p$ S $p$, Fig. 2, recessed in the outside of the cylinder, and has also ports E $p$, to take the exhaust from behind the piston through the exhaust-passages E $p$ to the exhaust-pipe E $x$. The steam-inlet and the exhaust-outlet are situated as shown in Figs. 1 and 7, from where they lead to the steam and exhaust belt E B and S B, Figs. 1, 2, 5, and from where the steam is taken for each end of the cylinder, and the exhaust is brought back through the grooves $m\ m$ in the piston in its regular forward and backward motion, the belts being open to the inside bore for free communication with the piston-surface.

The outside cylinder V is only a cover for these ports and passages, to facilitate the manufacture of the cylinder W, and makes a tight joint around the cylinder. The forward stroke of the piston P is used for the drilling of the rock, the piston being guided by the pawls Q Q, working in the straight grooves from $r$ to $r^1$ in the piston-rod T on its forward stroke, while the backward stroke is used for rotation of the drill, the valve-motion, and the feeding of the drill forward.

The rotation of the piston and drill is occasioned by each pawl Q following from the straight grooves $r^1\ r^1$, through the spiral grooves $g\ g$, into the next straight grooves $r\ r$ on the backward stroke, successively to and beyond the junction of the grooves, as the pawls are sliding in the bottom of the grooves, the depth of which is so arranged that the pawls Q Q cannot slide back in the same groove during the back stroke, but are compelled to pass at each stroke from one straight groove to the next following straight one, as they drop into a deeper part of the spiral groove $g\ g$ after passing the edge $r^2$ during the straight forward stroke of the piston, and drop again in a deeper part of the straight groove $r$ after passing the edge $r^3$ of the spiral groove on the backward stroke, gradually ascending in the meantime while sliding along in the different grooves.

The piston P being in solid connection with the rod T, the piston follows the same rotating and straight motion successively, as prescribed by the grooves in T. The motion itself is given by steam or air of high pressure brought alternately in front and behind the piston, which is done in this drilling-machine without any separate valve, the piston acting as the valve also, in the manner as will be now described.

The outer surface of the piston P has grooves or recesses $m\ m$ cut in, the number being the same as the number of straight or spiral grooves in the rod T, the shape of all these recesses being alike. At each back stroke the piston is turned one such part of a revolution as the number of grooves in the drawing represented as seven. Three of these grooves act as exhaust-ports on one side of the piston, while two on the opposite side act as steam-ports. The central part of these steam and exhaust ports slide over the openings of the steam belt or reservoir S B, Figs. 2, 5, through the sides of the cylinder, and lead steam along the grooves to openings $n\ n$, through which the steam is led to passages S $p$, which open in the bore of the cylinder in front of the piston, Fig. 2.

At the same time the used steam from the other end of the cylinder enters the ports $c\ c$ at the back end of the cylinder, fills the passages E $p$ in the cylinder-shell W, enters through the openings $c'\ c'$ in the back end of the grooves $m\ m$, Fig. 1, and is led by them in the exhaust-belt E B, Fig. 5, and escapes from there through the port E $x$, Figs. 1, 6, E $x$ in Fig. 7, and opening E $x$ in the front head of the machine, Fig. 1.

If the piston should be at the other end of the cylinder, the forward ends of grooves $m\ m$ would be placed over the exhaust-ports $d'\ d'$, Fig. 1, to take off the exhaust steam from the forward end of the cylinder through passages $d\ d'$, while the back ends of $m\ m$ communicate with the steam-ports $n'\ n'$, Fig. 2, to let steam behind the piston from the steam-belt. The shape of the steam and exhaust ports is to be in conformity with the grooves in the piston and the motion of the same.

One specified part of the stroke of the piston is taken up for this rotation, and the stroke can never be shorter than this; but the piston can overrun at each end some distance. The length of this overrunning in the forward stroke depends on the cutting away of the rock by the drill when the drill is once brought in the right position to work, and is used to work the feed-screw.

The feed-screw F is situated at the back end of the drilling-machine, where it is held in the back head X of the machine, in which it is allowed to turn. The screw itself, F, and the feed-nut $A^1$ project in the hollow piston, the nut being held by a collar, $A^2$, between the ring $d$ and cylinder-head W'. Outside the collar $A^2$ a part of the nut $A^3$ projects through the cylinder-head W', and is cut by two or more slots, and is turned tapering at the upper end, over which a nut, N, is fitted, to press the parts of $A^3$ together to obtain friction on the feed-screw F.

This friction must be strong enough to turn nut $A^1$ and screw F around together, when the piston P, on its straightforward stroke, turns the nut $A^1$ by the projections of the bush B, which projects in the spiral grooves $a\ a$, pressing against the forward edge of these grooves; but the friction must also allow the nut $A^1$ to unscrew from the feed-screw F, when the piston in the first part of the back stroke, moving a short distance back straight until the spiral grooves $g\ g$ come to the pawls Q Q in the rod T, turns the nut $A^1$ in the opposite direction, in which case the feed-screw F is held stationary by the pawl $x$ on the ratchet-wheel $F^2$, feeding the drill forward.

The outside shell of the piston P consists of cylindrical sections O O, fitted together around a cylindrical spring, U, between the heads of piston D and D', acting also as the packing of the piston.

Longitudinal projections $V^1\ V^2$ on the cylinder W, Sheet 2, Fig. 8, prevent the cylinder from turning in the shell Y when the drill is working. If the cylinder is to be drawn back in the shell, the pawl $x$ has to be lifted out the ratchet-wheel $F^2$, and the feed-screw to be turned backward by a hand-crank fitted on the upper end $F^3$ of the feed-screw.

Placing the shell Y with the cylinder W between the clamp-blocks B $b$ and C $c$ inside the strap L L, Fig. 8, the set-screw S $s$ tightens the blocks against the shell, and is also forcing the lower round end of block C $c$, which projects in the bore of the disk-plate $L^1$, against another friction-block, $M^1$, the upper end of which, $M^2$, projects also in the bore of the disk to meet the lower end of C $c$, in this way tightening the block $M^1$ against the bar H $h$, and holding the sleeve M on the same drilling-bar H $h$. The sleeve M is made in two parts, held together by the flanges $m\ m$, inclosing in a conical groove, $L^2$, the corresponding clamp-disk $L^1$. The bottom of the sleeve M is also cut longitudinally, and held by a bolt, D $d$, through a boss, $M^3$, for the purpose of holding the sleeve M on the drilling-bar or tripod H $h$ independent of the action of the set-screw S $s$ on the strap L.

What I claim as my invention, and desire to secure by Letters Patent, is—

1. The combination of the piston, provided with spiral passages, and the cylinder, provided with steam and exhaust passages, substantially as and for the purpose set forth.

2. In a rock-drilling machine, the combination of the cylinder, provided with steam and exhaust passages, and the piston, provided with a series of passages, whereby the piston, while receiving a rotary motion, receives steam for the whole stroke, substantially as specified.

3. The combination of the piston, having a reciprocating and rotary motion, and provided with spiral passages, and the cylinder, provided with steam and exhaust passages, substantially as set forth.

4. The combination of the piston-rod, provided with straight and spiral grooves, and the pawls Q, whereby the piston is positively guided both in its up and down movements, substantially as specified.

5. The combination of the cylinder, provided with steam and exhaust passages, the piston with a series of passages, and the piston-rod, provided with straight and spiral grooves to rotate the piston, substantially as set forth.

6. The combination of the piston-rod, provided with straight and spiral grooves, and pawls Q, and the feed-nut A, with the spiral grooves $a\ a$, the friction arrangement $A^3$ N at the upper end, bush B, with its projections in the grooves, feed-screw F, pawl $x$, and ratchet $F^2$, for the purpose of feeding the drill, substantially as specified.

7. The rock-drilling machine, with the longitudinal projections on the cylinder fitting in grooves in the shell, which is provided with longitudinal projections on its outside surface, in combination with the clamp, consisting of a clamp-strap provided with a beveled edge, fitting in a corresponding undercut on the saddle, the clamp-blocks, saddle, set-screw, bolt, and nut, substantially as and for the purpose specified.

8. The combination of feed-nut $A^1$, the part $A^3$ of which is slotted, the feed-screw F, and the conical nut N, substantially as specified.

THOS. B. FORD.

Witnesses:
T. W. GERECKE,
ARTHUR V. WILTSIE.